March 1, 1966   J. D. LAYTON   3,237,539
LIFT MECHANISM
Filed April 30, 1964

Jack D. Layton
INVENTOR.

BY Ramsey, Kolisch & Hartwell
Attys.

United States Patent Office 3,237,539
Patented Mar. 1, 1966

3,237,539
LIFT MECHANISM
Jack D. Layton, Salem, Oreg., assignor to Layton Manufacturing Co., Salem, Oreg., a corporation of Oregon
Filed Apr. 30, 1964, Ser. No. 363,928
7 Claims. (Cl. 94—44)

This invention relates to lift mechanism for applying a lifting force to portions of a towed vehicle. The lift mechanism operates through a connection with a towing vehicle which is pulling the towed vehicle along the ground by reason of a draft connection interconnecting the two vehicles.

In a specific and preferred embodiment of the invention, the lift mechanism is employed to elevate a trailing screed in paving or finishing apparatus comprising a towing vehicle (such as a dump truck) and a towed, wheel-supported spreader including a spreader box and screed (towed vehicle), where the screed trails the spreader box in the spreader. In such an organization, the trailing screed may partially support the weight of the spreader, and tracks, wheels or other means may support the front of the spreader. By supporting part of the weight of the spreader, substantial downward pressure is exerted by the screed on newly laid material.

With the lift mechanism of the invention, when the same is in operative position and actuated, rear portions of the spreader are tilted upwardly whereby the screed is raised and the spreader becomes entirely supported by the ground supports at the front end thereof. With such raising of the screed, the truck or towing vehicle may be backed up, or driven forwardly, or otherwise maneuvered, without the screed which is now elevated disturbing freshly laid aggregate or other paving material deposited during the finishing operation.

A general object of the invention, therefore, is to provide a novel form of lift mechanism for a towed vehicle, which may be actuated to lift or elevate rear portions of such a vehicle to make the same more maneuverable.

More specifically, an object is to provide lift mechanism which operates, through a connection with a towing vehicle, to swing or tilt a towed vehicle whereby the same becomes more completely supported by ground-traveling means at the front of the towed vehicle.

A further object is to provide improved apparatus for paving an area, comprising a spreader and a truck or other vehicle towing the spreader, where the spreader is supported by ground supports at the front thereof and a screed in trailing relation to the ground supports, which includes lift mechanism extending between the towing truck and the screed operable when actuated to lift the screed thus to place the spreader in a condition where the screed is above the ground and the spreader is entirely supported by the ground supports at the front end thereof.

Another object is to provide novel lift mechanism which is easily placed in operative condition, and when in operative condition is easily actuated to produce the lifting force desired in the rear of a towed vehicle.

These and other objects and advantages are attained by the invention, and the same is described hereinbelow in conjunction with the accompanying drawings, wherein.

Figure 1:
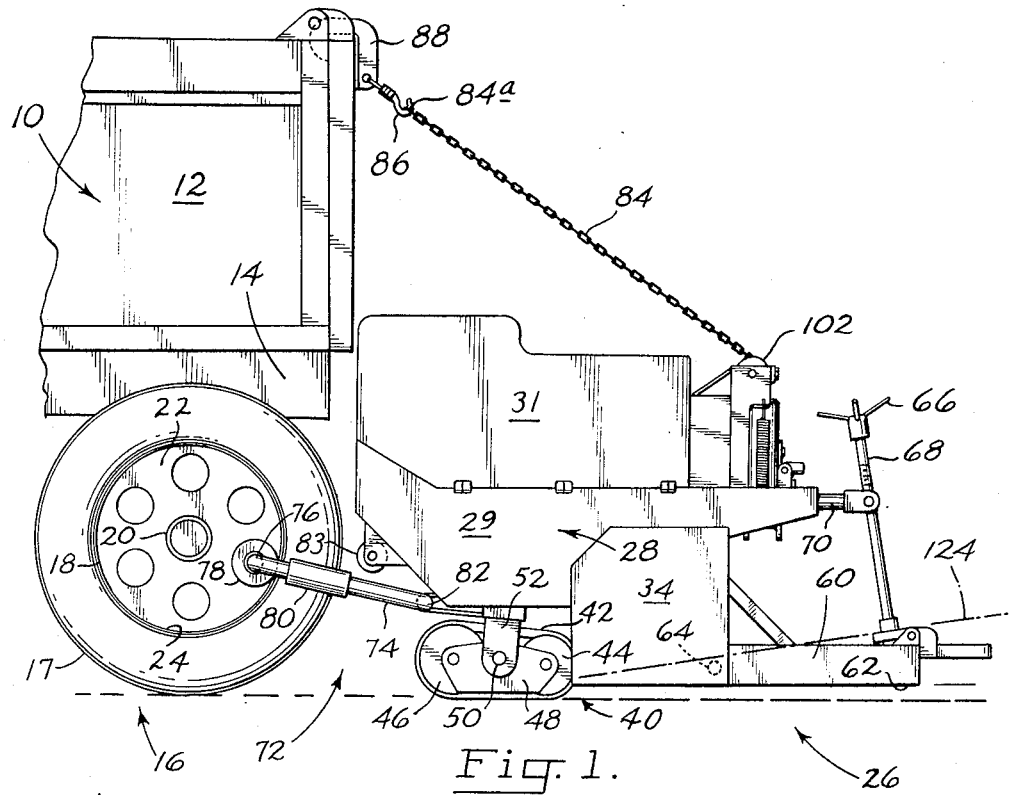
FIG. 1 is a side elevation illustrating portions of apparatus for paving an area, said apparatus including a dump truck and a spreader connected to the rear of the truck to be towed by the truck, such spreader operating to lay and spread paving material.

Referring first of all to FIG. 1, the rear of a conventional dump truck is indicated at 10, such truck including a box or dump body 12 mounted on a truck frame 14. The dump body may be raised at its forward end, by mechanism (not shown) to tilt the dump body, whereby material may cascade from out the rear end thereof. Supporting the dump truck for movement over the ground are rear, lateral support wheel assemblies 16, one being provided on each side of the truck.

In the usual instance, each support wheel assembly may include dual wheels comprising a pair of outer pneumatic tires 17 (one of which is not shown in FIG. 1) mounted on rims, such as rim 18, said rims being connected to hub structure 20 by spoke means 22. In such a construction, an annular surface 24 around the inside of the outer rim is presented, which may be utilized in attaching a towed vehicle, such as the spreader indicated generally at 26.

Spreader 26 includes the usual frame, and a box or hopper mounted on this frame shown at 28. In paving an area, for example, the aggregate which is to be laid is collected in hopper 28, upon the same being dumped from the rear of dump body 12. Above hopper 28 and hinged to panels 29 at the sides thereof, are panels 31, one on each side of the spreader, which may be secured at various angular positions relative to the sides of the hopper. The panels function to guide material falling from the dump body into the hopper.

Spreader 26 is provided, on either side thereof, with upstanding "strike off" plates 34, which serve to contain material flowing from the hopper whereby side margins of a strip being laid are defined. Not shown, but with ends disposed inwardly of these strike off plates, is an elongated opening extending transversely and along the base of the spreader and connecting with the base of the hopper, through which material flows on traveling to the area to be covered.

Adjacent the forward end of the spreader, and on either side thereof, are ground-traveling support means, such as the one indicated generally at 40 in FIG. 1. Each may comprise a continuous track 42, traveling over wheels 44, 46 journaled on a mounting 48. Mounting 48 is pivotally mounted at 50 on legs such as leg 52 extending downwardly from the frame of the spreader.

Extending transversely of spreader 26 adjacent the rear thereof is a screed 60. The screed may comprise a substantially horizontal, flat plate 62, extending transversely of the spreader. The plate functions to slide over aggregate flowing from the spreader, and while doing so smooths and levels out the same. The screed may be connected at its first forward end to the spreader through a pivot connection such as the one generally indicated at 64. A hand wheel 66 is included, which is used to adjust a screw-operated extensible mechanism 68 extending between a rear portion of the screed and a mounting 70 projecting rearwardly of the hopper in the spreader. With this construction, and on manipulation of the hand wheel, the position of the screed relative to the base of the spreader box may be changed, which has the effect of varying the thickness of the layer of aggregate spread over the area being paved.

The spreader is connected to the drawing or towing vehicle, i.e., dump truck 10, by draft means shown at 72. Such draft means may comprise a pair of arms, such as arm 74, provided on either side of the apparatus, which extend forwardly from the front of the spreader and have inturned portions 76 at forward extremities thereof. Journaled on the inturned ends of these arms are rollers such as roller 78, which ride on the inner annular surfaces of the wheel rims. Sleeves 80, journaled on the arms where they extend across the sides of the tires, provide rolling contact between the sides of the arms and the tires, on movement of the vehicle. Each arm is pivotally supported on the frame of the spreader, by pivot means 82 pivoting the rear end of an arm.

Means (not shown) is included for bringing the opposed arms on either side of the apparatus inwardly toward each other, whereby they may be properly positioned with their rollers riding on the annular surfaces of the wheel rims. To release spreader 26 from the dump truck, the arms are shifted laterally outwardly of the wheel assemblies for the dump truck. The arms, as already noted, are pivoted adjacent their rear ends, which enables up and down movement to occur in the spreader relative to the dump truck, on travel of the two structures over the area being paved. The draft connection described accommodates fast attachment of the spreader to the rear end of a dump truck, whereby a spreader may then be towed while the contents of the truck is dumped into the spreader. Upon the dump truck being emptied, the spreader is readily detached from the truck, to permit a new filled truck to be backed into place and the spreader then to be attached to this truck.

Rollers, such as the one shown at 83, may be journaled on lower forward portions of the spreader adjacent draft means 72. These are rotatable about horizontal axes, extending transversely of the spreader. On backing of the dump truck, its tires 17 come in contact with the rollers, to enable a backward push to be exerted on the spreader.

With the type of spreader described, smooth, paved surfaces are produced with the spreader towed to the left in FIG. 1, and the screed at the rear thereof sliding over the aggregate to smooth and level it. The construction, however, is not adapted to accommodate backing up of the vehicle with the spreader attached, as this causes the screed in the spreader to be moved backwardly while sliding over the surface thereof just laid, whereby it may dig into the surface thereof and destroy the smoothness thereof. Further, the construction does not accommodate forward movement of the spreader, with the screed not contacting the material just laid. To accommodate such and other maneuvering, this invention contemplates novel lift mechanism, which when placed in operative position, interconnects the rear of the dump truck and the spreader, and which includes means whereby the screed may be lifted off the ground when desired, the spreader then being substantially entirely supported by ground-traveling support means 40 adjacent the forward end thereof.

Thus, and more specifically, extending between the dump truck and the spreader, and located at an elevation above the draft means interconnecting the two vehicles, is an elongated tension-transmitting member, more specifically a flexible chain, shown at 84. The chain has a link 84a at the forward end thereof which is connected to a hook 86 swiveled at the base of a mounting 88. Mounting 88 has a generally inverted U-shape, and fits over the rear side of the box in the dump truck. With the lift mechanism not in use, mounting 88 is lifted off and removed from the box of the dump truck, whereby the chain no longer forms a connection between the spreader and the dump truck.

Figures 2, 3:
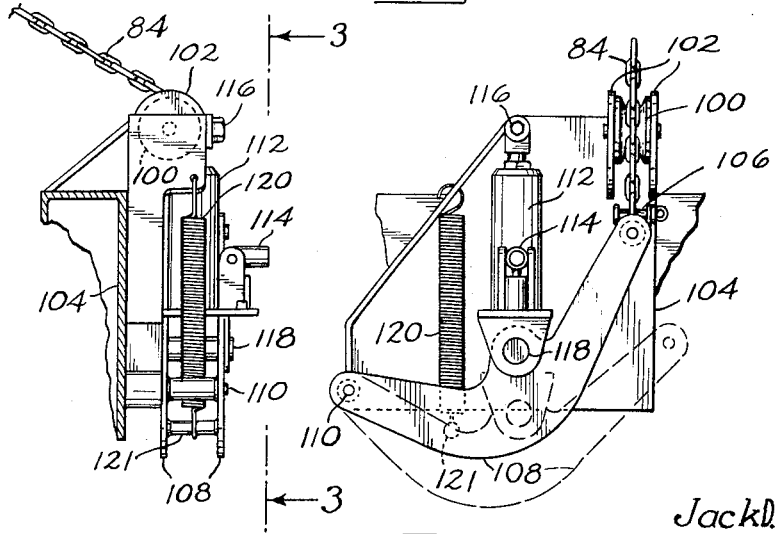
FIG. 2 is an enlarged view of portions of the spreader illustrated in FIG. 1.
FIG. 3 is a view along the line 3—3 in FIG. 2.

The chain, progressing rearwardly from its forward end, travels over a grooved roller or guide means 100 (see FIG. 3). Roller 100 is disposed adjacent the rear of the vehicle and above the level of support means 40, and journaled between ears 102 integral with plate structure 104 mounted on the back wall of the spreader box. The rear end of chain 84 is connected, by means of assembly 106, to one end of a lever arm structure or take-up means 108. This structure is pivoted at 110, to plate structure 104.

In order to produce lifting of the screed and rear portions of the spreader, tension is produced in flexible chain 84, by pulling the chain away from the dump truck. With the chain extending between the dump truck and spreader, and disposed at an elevation above the draft means as shown, and on tension being produced therein, rear portions of the spreader are drawn toward upper rear portions of the dump truck, whereby the screed and rear portions of the speader are raised. Lifting of rear portions of the spreader is accompanied with the spreader box and frame swinging about pivots 50 for mountings 48, and with swinging of draft means 72 relative to the spreader about pivot connections 82.

An extensible means or jack 112 is provided for the purpose of actuating arm structure 108 whereby to tension chain 84. Jack 112 is a conventional form of jack, and is extended by manipulation of a handle socket 114. The jack has an upper end pivoted at 116 to plate 104, and the base of the jack is pivoted at 118 to an intermediate portion of lever arm structure 108. Also extending between the lever arm structure and plate 104 is a coil spring 120, having its top end connected to plate 104, and its bottom end connected to the lever arm structure, at 121.

When the handle socket is moved up and down, the jack in a conventional manner extends, which has the effect of swinging the lever arm structure downwardly in FIG. 3, toward the position indicated in dashed outline in FIG. 3. When such occurs, tension is produced in the chain, and the forward end of the chain is drawn inwardly toward the spreader. As a result, a lifting force is produced whereby the screen may be lifted from the ground. In this way, the base of the screed may be shifted to a position such as the one indicated by dashed line 124 in FIG. 1. With such a change in the position of the screed, the spreader, including its screed and other structure, becomes entirely supported by the ground-traveling supports at the forward end of the spreader.

With the screed so positioned, the dump truck and spreader may be backed up or moved forwardly, without the screed disturbing any layer of aggregate which may have been laid under the screed. It will be noted that the screed may be lifted upwardly, without destroying its position relative to the spreader hopper or box 28, as determined by hand wheel 66. This setting remains undisturbed, which is a desirable feature.

To place the parts in their original position, where aggregate may be leveled off, the jack is released, with coil spring 120 then operating to pull the lever arm structure back to its original position. This releases tension in the chain which enables the chain to be detached from the dump vehicle.

The lift mechanism is easily attached to the dump truck, and is as easily removed. Because chain 84 is flexible, turning of the dump truck relative to the spreader is permitted. With the lift mechanism of the invention, maneuverability is afforded, without the necessity of lifting the entire spreader structure from the ground. This results in a substantial increase in the versatility of the apparatus.

While an embodiment of the invention has been described, changes and variations are possible without departing from the invention. It is desired to cover all such modifications and variations, as would be apparent to one skilled in the art, and that come within the scope of the appended claims.

It is claimed and desired to secure by Letters Patent:

1. For a towed vehicle having forward and rear ends and lateral support means at least partially supporting the forward end of the vehicle for movement over the ground,
 draft means for towing the vehicle,
 an elongated, flexible, tension-transmitting element in operative position extending above said draft means, said tension-transmitting element having a forward end adapted to be detachably connected to a towing vehicle,
 guide means for said tension-transmitting element mounted on the towed vehicle at a point located above the elevation of the lateral support means and toward the rear of the towed vehicle from said support means, said tension-transmitting element having a portion intermediate its ends passing through said guide means, and mechanism on said towed vehicle connected to a rear end portion of said tension-transmitting element for pulling the same through said guide means, the latter mechanism including an extensible hydraulic jack mounted in relation to said tension-transmitting element whereby on extension of the jack the jack is actuatable to place tension in said tension means.

2. The combination of a towing vehicle, a towed vehicle, draft means connecting the towing and towed vehicles, an elongated, flexible, tension-transmitting element connected to the towing vehicle and extending from the towing vehicle above said draft means to said towed vehicle, and means connecting the tension-transmitting element to the towed vehicle including mechanism which is actuatable to produce tension in the tension-transmitting element whereby portions of said towing and towed vehicles disposed above said draft means may be pulled toward each other, said means comprising an arm mounted on the towed vehicle including a portion movable in a path, and an extensible hydraulic jack operatively connected to the arm operable on extension to produce movement of said portion of said arm, said tension-transmitting element being connected to said portion of said arm.

3. In paving apparatus to be towed behind a towing vehicle, including a spreader and draft means for connecting the spreader to the towing vehicle, said spreader including a spreader box, lateral support means supporting forward portions of the spreader for movement over the ground, and a screed adjacent the rear of the spreader trailing the spreader box for leveling out material flowing from the box, the improvement comprising an elongated chain adapted to be extended from the spreader to the towing vehicle with such disposed above said draft means, means on one end of the chain for securing said one end to the towing vehicle and means operatively connecting the opposite end of the chain and said spreader at a point disposed rearwardly of said lateral support means, said means connecting said opposite end of the chain and spreader comprising a take-up arm mounted on the spreader including a portion movable in a path, means operatively connected to said arm for producing movement of said portion in its said path, and means connecting said opposite end of said chain to said portion of said take-up arm, said portion of said take-up arm on moving into its said path producing tension in said chain whereby a lifting force is exerted on said screed.

4. The apparatus of claim 3, wherein said take-up arm is mounted rearwardly of said spreader box above said screed with its said movable portion movable vertically, and which further includes guide means training an intermediate portion of said chain over said spreader box.

5. For a towed vehicle having forward and rear ends and lateral support means at least partially supporting the forward end of said vehicle for movement over the ground, draft means for towing the vehicle, an elongated, flexible chain in operative position extending above said draft means having a forward end adapted to be detachably connected to a towing vehicle, guide means for said chain mounted on the towed vehicle in a region located above the elevation of said lateral support means and toward the rear of the towed vehicle from said lateral support means, said chain having a portion intermediate its ends passing over said guide means, and a take-up arm including a portion movable in a path mounted on said towed vehicle rearwardly of said guide means, said chain having its rear end connected to said take-up arm.

6. The apparatus of claim 5, which further comprises a jack connected to said take-up arm actuatable to produce movement of said portion of said arm.

7. In a spreader including a spreader box, lateral support means supporting the forward end of the spreader box for movement over the ground, and a screed trailing the spreader box at the rear end of the spreader for leveling out material flowing from the box, a guide mounted on the spreader adjacent the rear and top of the spreader box adapted to train a chain passed thereover, a take-up arm and means pivotally mounting the arm on the spreader with the arm located rearwardly of said spreader box above said screed, said arm being pivotable about an axis extending between the forward and rear ends of the spreader and having an end located beneath said guide, an elongated chain having one end connected to said end of said take-up arm, said chain having means on its opposite end for attaching the chain to the dump body of a dump truck, said chain fitting within said guide when passed over the spreader box to adjacent said dump truck, and an extensible jack, connected at one end to said take-up arm and at its opposite end to said spreader, operable on actuation to shift said end of said take-up arm downwardly, with the arm when so moved operating to tension said chain when the chain has its opposite end attached to the dump body of a dump truck, said chain on being tensioned operating to apply a lifting force to the rear end of the spreader and the screed located thereat.

References Cited by the Examiner

UNITED STATES PATENTS

| | | | |
|---|---|---|---|
| 2,003,628 | 6/1935 | Chadwick | 94—44 X |
| 2,914,995 | 12/1959 | Odell | 94—46 |
| 3,034,410 | 5/1962 | Ross | 94—46 |

CHARLES E. O'CONNELL, *Primary Examiner.*

N. C. BYERS, *Assistant Examiner.*

Dedication 3,237,539.—*Jack D. Layton*, Salem, Oreg. LIFT MECHANISM. Patent dated Mar. 1, 1966 Dedication filed Dec. 14, 1972, by the inventor and the assignee, *Layton Manufacturing Co.*

Hereby dedicate to the Public the entire remaining term of said patent.

[*Official Gazette May 1, 1973.*]